United States Patent
Bochenek et al.

(10) Patent No.: US 9,802,486 B2
(45) Date of Patent: Oct. 31, 2017

(54) INTERIOR DISPLAY SYSTEMS AND METHODS

(71) Applicant: Robert Bosch GmbH, Stuttgart (DE)

(72) Inventors: Jeffrey Allen Bochenek, Milford, MI (US); Jonathan Charles Diedrich, Carleton, MI (US)

(73) Assignee: Robert Bosch GmbH, Stuttgart (DE)

( * ) Notice: Subject to any disclaimer, the term of this patent is extended or adjusted under 35 U.S.C. 154(b) by 26 days.

(21) Appl. No.: 15/035,440

(22) PCT Filed: Nov. 17, 2014

(86) PCT No.: PCT/US2014/065911
§ 371 (c)(1),
(2) Date: May 9, 2016

(87) PCT Pub. No.: WO2015/073950
PCT Pub. Date: May 21, 2015

(65) Prior Publication Data
US 2016/0288644 A1    Oct. 6, 2016

Related U.S. Application Data

(60) Provisional application No. 61/905,656, filed on Nov. 18, 2013.

(51) Int. Cl.
*H04N 7/18*     (2006.01)
*B60K 35/00*    (2006.01)
(Continued)

(52) U.S. Cl.
CPC .............. *B60K 35/00* (2013.01); *G01S 13/02* (2013.01); *G01S 17/02* (2013.01);
(Continued)

(58) Field of Classification Search
USPC ....... 348/148, 141, 118, 120, 706, 719, 744, 348/837, 47, 48, 142, 143, 151, 159, 169,
(Continued)

(56) References Cited

U.S. PATENT DOCUMENTS 5,949,595 A  *  9/1999  Kissinger ................ B60R 1/008
                                                                     359/854
7,629,877 B2 * 12/2009  Lvovskiy ............... G02B 27/01
                                                                     340/438
(Continued)

FOREIGN PATENT DOCUMENTS

DE        19801884 A1    7/1999
DE    102004014671 A1   10/2005
(Continued)

OTHER PUBLICATIONS

International Search Report and Written Opinion for Application No. PCT/US2014/065911 dated Mar. 5, 2015 (11 pages).

*Primary Examiner* — Jefferey F Harold
*Assistant Examiner* — Mustafizur Rahman
(74) *Attorney, Agent, or Firm* — Michael Best & Friedrich LLP

(57) ABSTRACT

System and method for using an interior display device in a vehicle. The interior display device includes a projection device and a controller. The controller is configured to receive a plurality of vehicle parameters and determine an expected location within an interior of the vehicle based on the plurality of vehicle parameters. The expected location corresponds to an interior area of the vehicle where a driver would be expected to look. The controller is further configured to select an image (515, 520) based on the plurality of vehicles parameters and operate the projection device to project the image at the expected location within the interior of the vehicle.

17 Claims, 5 Drawing Sheets

(51) Int. Cl.

| | | |
|---|---|---|
| *G02B 27/01* | (2006.01) | |
| *G02B 27/00* | (2006.01) | |
| *G01S 13/02* | (2006.01) | |
| *G01S 17/02* | (2006.01) | |
| *G06F 3/0481* | (2013.01) | |
| *H04N 5/232* | (2006.01) | |

(52) U.S. Cl.
CPC ......... *G02B 27/0093* (2013.01); *G02B 27/01* (2013.01); *G02B 27/0101* (2013.01); *G06F 3/04817* (2013.01); *H04N 5/23293* (2013.01); *B60K 2350/1084* (2013.01); *B60K 2350/1088* (2013.01); *B60K 2350/2013* (2013.01); *B60K 2350/2052* (2013.01); *B60K 2350/922* (2013.01); *B60K 2350/927* (2013.01); *B60K 2350/962* (2013.01); *B60K 2350/965* (2013.01); *G02B 2027/014* (2013.01); *G02B 2027/0138* (2013.01); *G02B 2027/0183* (2013.01); *G02B 2027/0187* (2013.01)

(58) Field of Classification Search
USPC ........ 348/25, 46, 52, 135, 725; 701/1, 3, 36, 701/37, 39, 41, 43, 53, 54, 69, 70, 71, 72, 701/91, 93, 96, 400, 444, 468
See application file for complete search history.

(56) References Cited

U.S. PATENT DOCUMENTS

| | | | |
|---|---|---|---|
| 8,350,686 B2 | 1/2013 | Inoue | |
| 8,421,863 B2 | 4/2013 | Yumiba et al. | |
| 2003/0103141 A1* | 6/2003 | Bechtel | G07C 5/0891 348/148 |
| 2003/0193651 A1* | 10/2003 | Egle | G03B 21/00 353/31 |
| 2003/0197660 A1* | 10/2003 | Takahashi | G08G 1/168 345/7 |
| 2004/0056955 A1* | 3/2004 | Berberich | B60R 1/00 348/148 |
| 2005/0046755 A1* | 3/2005 | Hattori | B60R 11/0211 348/837 |
| 2006/0115124 A1* | 6/2006 | Nobori | B60R 1/00 382/104 |
| 2006/0187421 A1* | 8/2006 | Hattori | H04N 5/74 353/69 |
| 2007/0297075 A1* | 12/2007 | Schofield | B60R 1/04 359/872 |
| 2009/0067057 A1* | 3/2009 | Sprague | G02B 27/0101 359/630 |
| 2009/0234529 A1* | 9/2009 | Sampedro Diaz | G06F 9/4443 701/31.4 |
| 2009/0252375 A1* | 10/2009 | Rekimoto | G06F 3/017 382/103 |
| 2010/0123779 A1* | 5/2010 | Snyder | G07C 5/0866 348/148 |
| 2010/0238280 A1* | 9/2010 | Ishii | B60K 35/00 348/77 |
| 2011/0246022 A1* | 10/2011 | Bai | B60H 1/00771 701/36 |
| 2012/0062999 A1* | 3/2012 | Kuhlman | H04N 13/0404 359/639 |
| 2012/0140072 A1* | 6/2012 | Murashita | G06K 9/00805 348/148 |
| 2013/0131921 A1* | 5/2013 | Uhlmann | B61L 29/24 701/36 |
| 2013/0307984 A1* | 11/2013 | Pan | B60R 1/12 348/148 |
| 2014/0340516 A1* | 11/2014 | Vojtisek | B60R 1/00 348/148 |
| 2015/0251602 A1 | 9/2015 | Baur et al. | |
| 2016/0137126 A1* | 5/2016 | Fursich | B60R 1/00 348/38 |

FOREIGN PATENT DOCUMENTS

| | | |
|---|---|---|
| DE | 102007005028 A1 | 8/2008 |
| DE | 102011112717 A1 | 3/2013 |
| DE | 102011121285 A1 | 6/2013 |
| EP | 2473871 B1 | 7/2012 |
| JP | 2003341383 A | 12/2003 |
| WO | 2007/028630 A1 | 3/2007 |

* cited by examiner

INTERIOR DISPLAY SYSTEMS AND METHODS

RELATED APPLICATIONS

This application claims priority to U.S. Provisional Application No. 61/905,656, filed on Nov. 18, 2013 and titled "INTERIOR DISPLAY SYSTEMS AND METHODS," the entire contents of which is incorporated by reference.

BACKGROUND

The present invention relates methods and systems for using the interior of a vehicle as a display.

While driving, a driver may not always be focused on the instrument panel or other displays mounted at the front of the vehicle (e.g., in front of the driver when the driver is looking out the front windshield). For example, while backing up, the driver may turn their head and look out the rear windshield. During these situations, the driver cannot view many of the displays included in the vehicle. Accordingly, the driver may not see an alert or other useful information provided on the displays when driving in reverse or performing other vehicle maneuvers. Therefore, other interior surfaces of the vehicle can be used to display information to the driver to place the display within the driver's field of view.

SUMMARY

The invention provides an interior display device for a vehicle. The interior display device includes a projection device and a controller. The controller is configured to receive a plurality of vehicle parameters and determine an expected location within an interior of the vehicle based on the plurality of vehicle parameters. The expected location corresponds to an interior area of the vehicle where a driver would be expected to look. The controller is further configured to select an image based on the plurality of vehicles parameters and operate the projection device to project the image at the expected location.

The invention also provides a method of using an interior of a vehicle as a display. The method includes receiving a plurality of vehicle parameters at a controller and determining an expected location within an interior of the vehicle based on the plurality of vehicle parameters using the controller. The expected location corresponds to an interior area of the vehicle where a driver would be expected to look. The method thither includes selecting an image based on the plurality of vehicle parameters with the controller and displaying the hinge at the expected location with a projection device.

Other aspects of the invention will become apparent by consideration of the detailed description and accompanying drawings.

DETAILED DESCRIPTION

Figure 1:
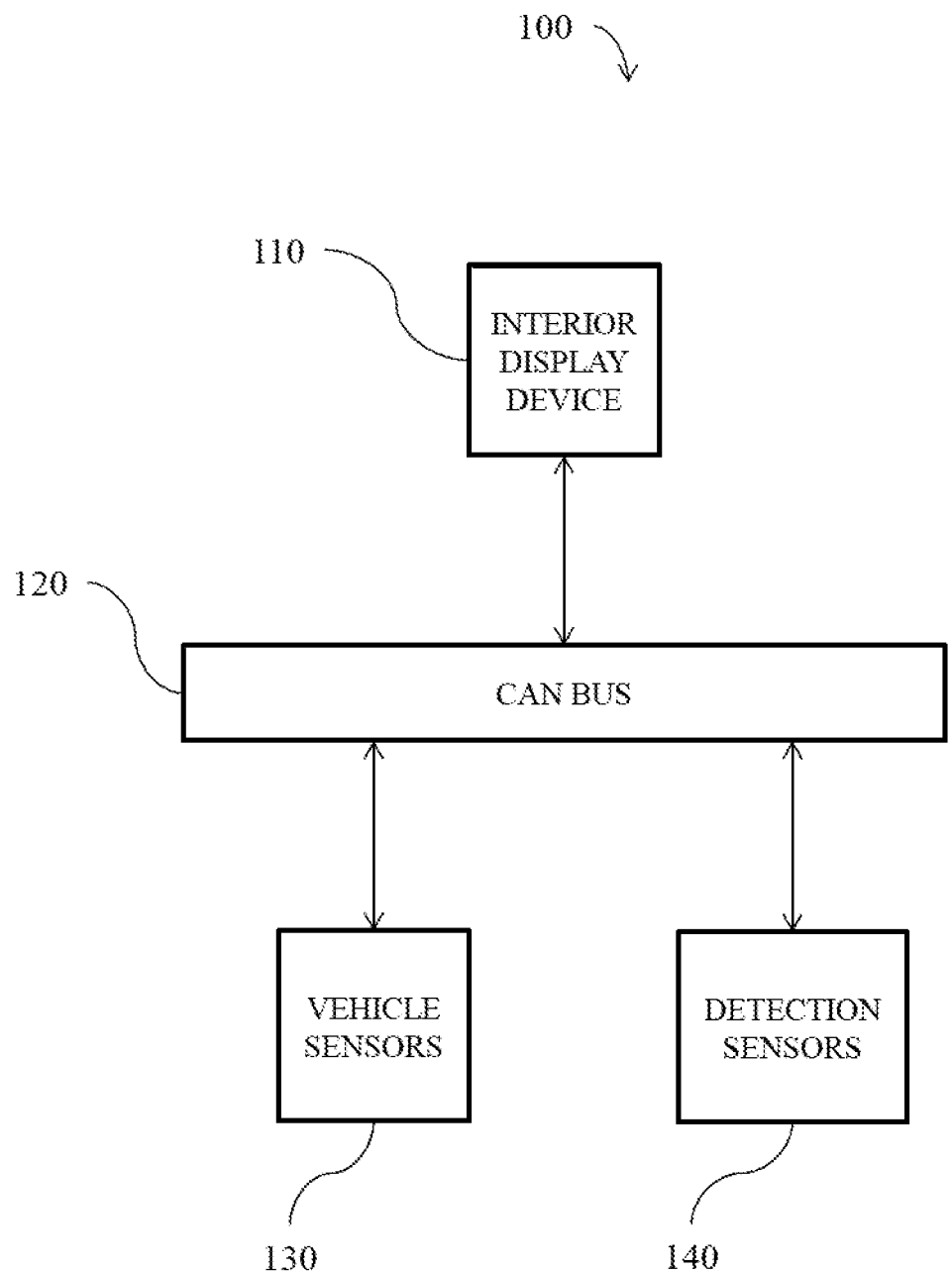
FIG. 1 is a block diagram of interior display system for a vehicle.

Before any embodiments of the invention are explained in detail, it is to be understood that the invention is not limited in its application to the details of construction and the arrangement of components set forth in the following description or illustrated in the following drawings. The invention is capable a other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should also be noted that a plurality of hardware and software based devices, as well as a plurality of different structural components may be utilized to implement the invention. Furthermore, and as described in subsequent paragraphs, the specific configurations illustrated in the drawings are intended to exemplify implementations of the invention. Alternative configurations are possible.

An interior display system 100 for a vehicle includes, among other components, an interior display device 110, a controller area network ("CAN") bus 120, a plurality of vehicle sensors 130, and a plurality of detection sensors 140, as illustrated in FIG. 1. The plurality of vehicle sensors 130 sense or provide a plurality of vehicle parameters including, for example, steering angle, vehicle speed, gear selection (e.g., forward or reverse), vehicle speed, turn signal status, brake status, and position data (e.g., GPS). The plurality of detection sensors 140 provide information or parameters related to detected or sensed objects located around the vehicle. The plurality of detection sensors 140 may include, for example, cameras, RADAR units, and LIDAR units. The cameras can be positioned to capture an image or a series of images of a field of view around the vehicle. For example, one or more cameras can capture images of a blind spot of the vehicle. The RADAR units and LIDAR units detect the presence and position of objects (e.g., other vehicles, pedestrians, trees, etc.) located around the vehicle. In the implementation shown, the plurality of vehicle sensors 130 and the plurality of detection sensors 140 communicate with the interior display device 110 via the CAN bus 120. A different type of communication or other connections may be used, including wired and wireless connections.

Figure 2:
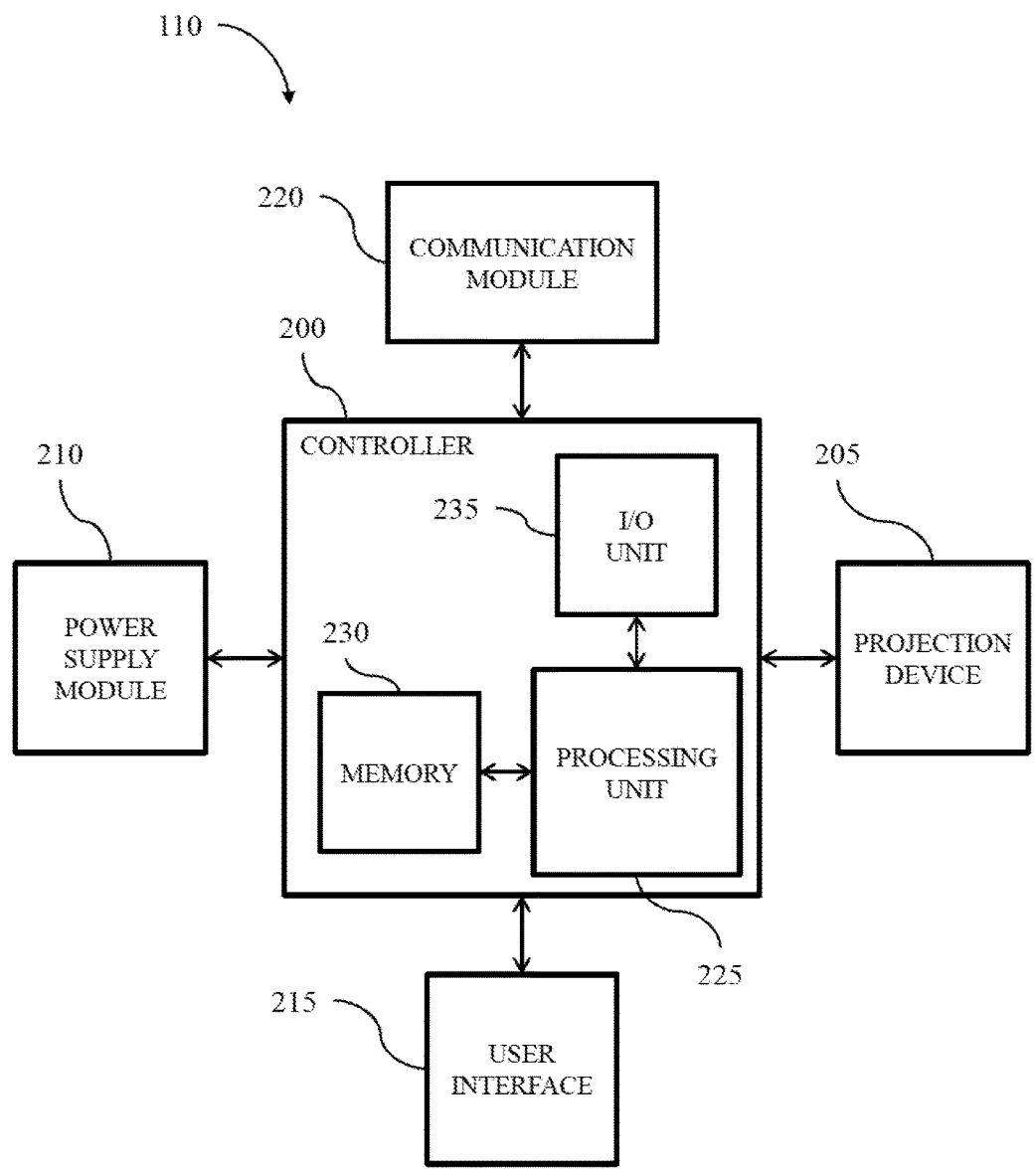
FIG. 2 is a block diagram of an interior display device capable of being used in the interior display system of FIG. 1.

FIG. 2 illustrates the interior display device 110 of FIG. 1 including, among other components, a controller 200, a projection device 205, a power supply module 210, a user interface 215, and a communication module 220.

The controller 200 includes, or is connected to an external device (e.g., a computer), which includes combinations of software and hardware that are operable to among other things, control the operation of the projection device 205. In one implementation, the controller 200 or external device includes a printed circuit board ("PCB") that is populated with a plurality of electrical and electronic components that provide, power, operational control, and protection to the interior display device 110. In some implementations, the PCB includes, for example, a processing unit 225 (e.g., a microprocessor, a microcontroller, or another suitable programmable device), a memory 230, and a bus. The bus connects various components of the PCB including the memory 230 to the processing unit 225. The memory 230 includes, for example, a read-only memory ("ROM"), a random access memory ("RAM"), an electrically erasable programmable read-only memory ("EEPROM"), a flash memory, a hard disk, or another suitable magnetic, optical, physical, or electronic memory device. The processing unit 225 is connected to the memory 230 and executes software that is capable of being stored in the RAM (e.g., during execution), the ROM (e.g., on a generally permanent basis), or another non-transitory computer readable medium such as another memory or a disc. Additionally or alternatively, the memory 230 is included in the processing unit 225. The controller 200 also includes an input/output ("I/O") unit 235 that includes routines for transferring information between components within the controller 200 and other components of the interior display device 110 or the interior display system 100. For example, the communication module 220 is configured to provide communication between the interior display device 110 and the CAN bus 120.

Software included in some implementations of the interior display device 110 is stored in the memory 230 of the controller 200. The software includes, for example, firmware, one or more applications, program data, one or more program modules, and other executable instructions. The controller 200 is configured to retrieve from memory 230 and execute, among other components, instructions related to the control processes and methods described below. In some implementations, the controller 200 or external device includes additional, fewer, or different components.

The PCB also includes, among other components, a plurality of additional passive and active components such as resistors, capacitors, inductors, integrated circuits, and amplifiers. These components are arranged and connected to provide a plurality of electrical functions to the PCB including, among other things, filtering, signal conditioning, or voltage regulation. For descriptive purposes, the PCB and the electrical components populated on the PCB are collectively referred to as the controller 200.

The power supply module 210 supplies a nominal AC or DC voltage to the interior display device 110. In some implementations, the power supply module 210 is powered by an alternator of the vehicle. In some implementations, the power supply module 210 is powered by one or more batteries or battery packs, such as a car battery. The power supply module 210 is also configured to supply lower voltages to operate circuits and components within the interior display device 110.

The user interface 215 is included to control the interior display device 110. The user interface 215 is operably coupled to the controller 200 to control, for example, the position of images projected by the projection device 205. The user interface 215 can include any combination of digital and analog input devices required to achieve a desired level of control for the system. For example, the user interface 215 can include a computer having a display and input devices, a touch-screen display, and a plurality of knobs, dials, switches, buttons, faders, or the like. In some implementations, the user interface 215 is separated from the interior display device 110.

The communication module 220 sends and/or receives signals to and/or from one or more separate communication modules. Signals include, among other components, information, data, serial data, and data packets. The communication module 220 can be coupled to one or more separate communication modules via wires, fiber, and/or a wirelessly. Communication via wires and/or fiber can be any appropriate network topology known to those skilled in the art, such as Ethernet. Wireless communication can be any appropriate wireless network topology known to those skilled in the art, such as Wi-Fi.

The projection device 205 includes one or more projectors. The one or more projectors can be mounted to the interior of the vehicle to display images on the interior of the vehicle. The one or more projectors can include PICO projectors manufactured by Optima, LG, and AAXA. PICO projectors are found in some smart phones and other handheld devices. Therefore, in some implementations, rather than directly mounting projectors in the vehicle, the projection device 205 can include a docking station for a smart phone that positions a projector included in the smart phone to project images as described herein.

The projectors are used to project one or more hinges on interior surfaces of the vehicle that otherwise do not include a display. For example, the projectors can be used to project one or more images on the interior surface of the front or rear windshield, the interior surface of a side window, a surface of a rear seat, the ceiling, vehicle pillars, the floor, door panels, vehicle consoles, etc.

Figure 3:
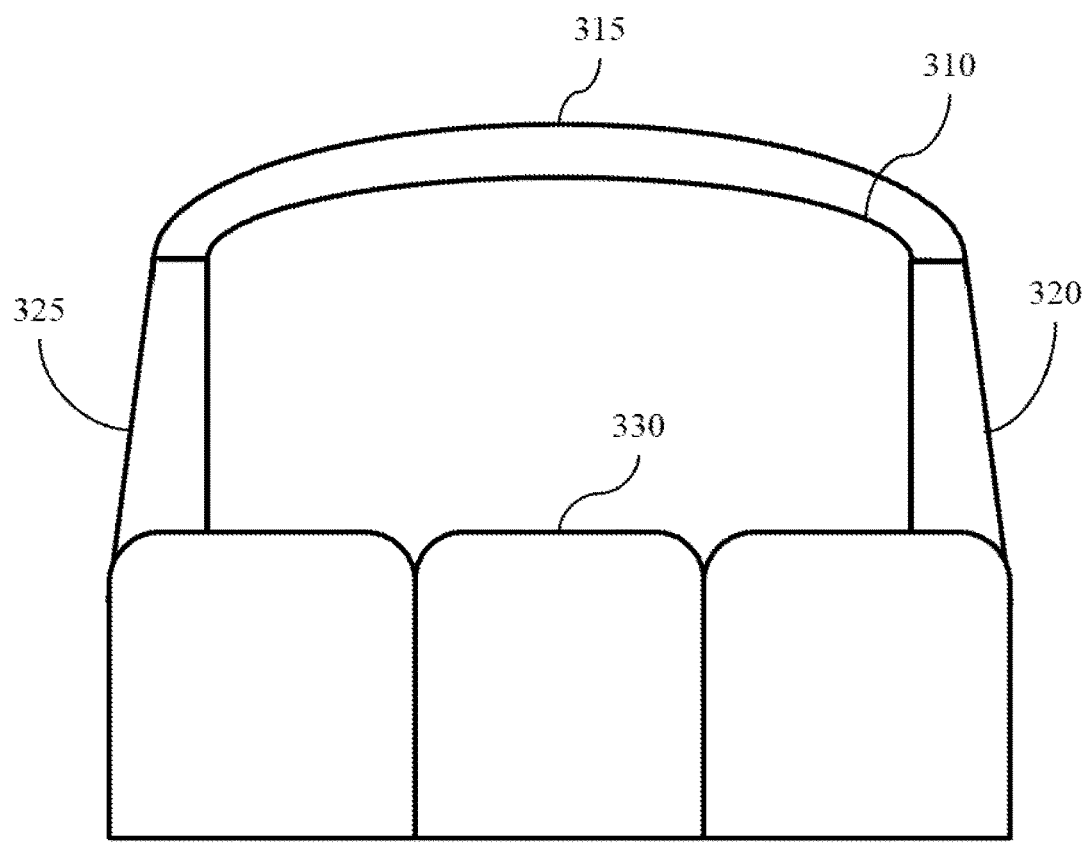
FIG. 3 is a diagram of an interior of a vehicle including a projection device capable of being used in the interior display device of FIG. 2.
Figure 3:
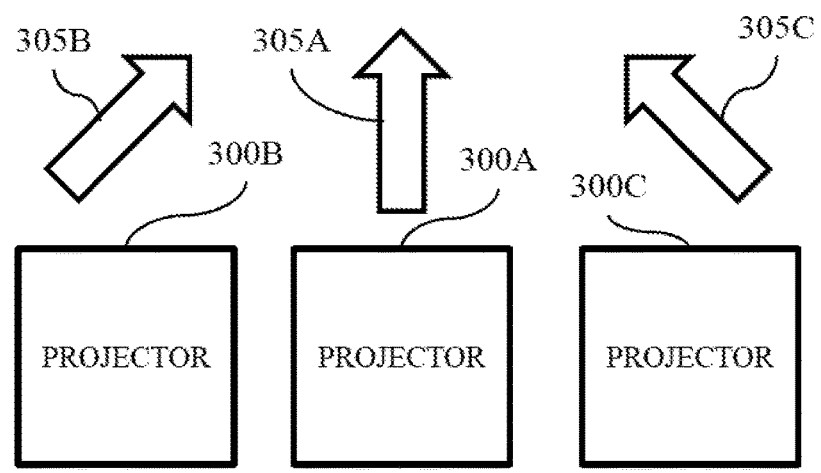

FIG. 3 illustrates an implementation of the projection device 205 in the interior of a vehicle. The project on device 205 includes, among other components, a plurality of projectors 300A-300C. The plurality of projectors 300A-300C is positioned to project inns in the direction indicated by arrows 305A-305C, respectively. Projector 300A projects images on the rear windshield 310 or the ceiling area 315 above the rear windshield 310. Projector 300B projects images on the driver side rear pillar 320. Projector 300C projects images on the passenger side rear pillar 325. In some implementations, projector 300A projects images on the middle rear seat 330.

Figure 4:
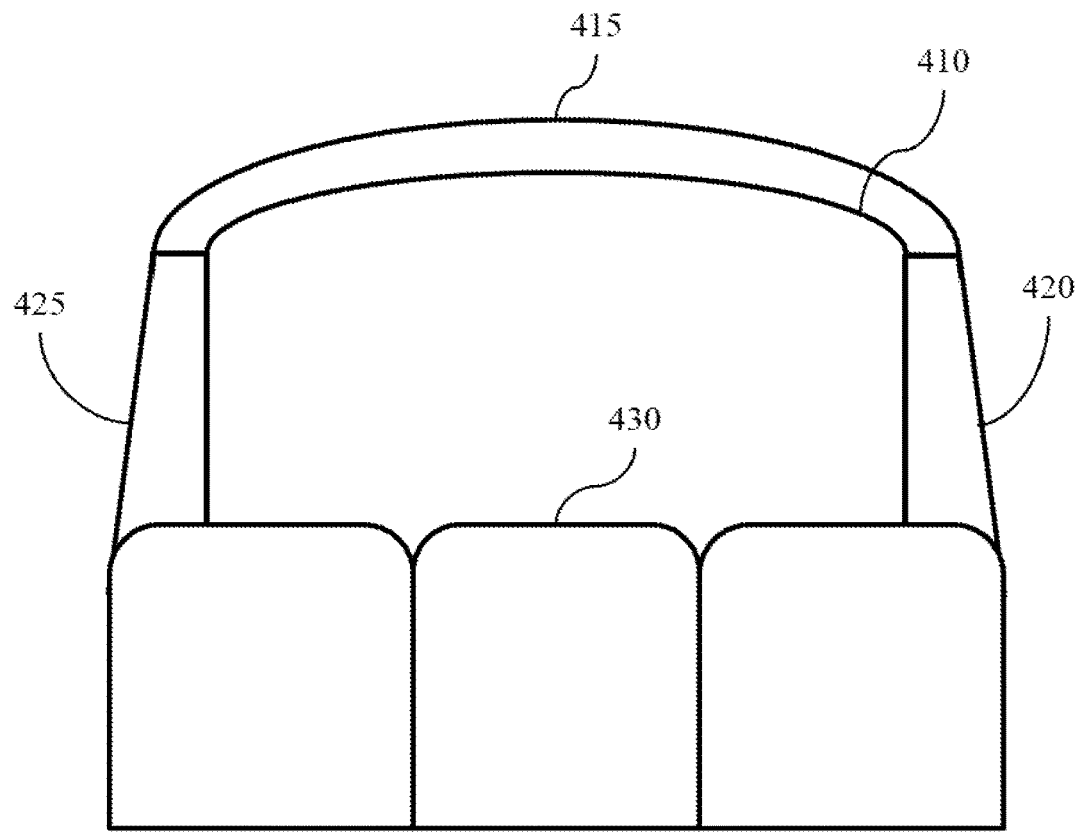
FIG. 4 is a diagram of an interior of a vehicle including a projection device capable of being used in the interior display device of FIG. 2.
Figure 4:
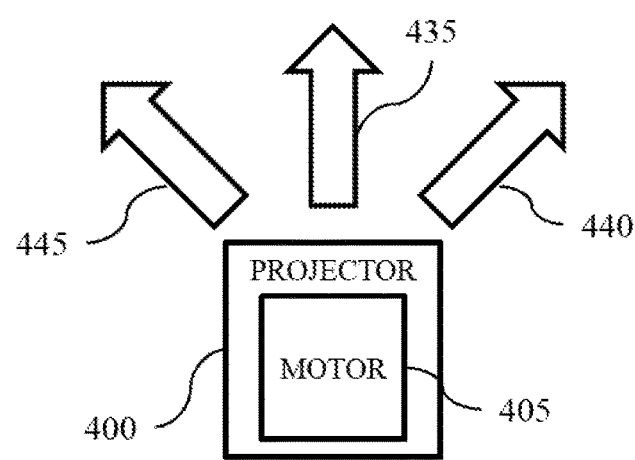

FIG. 4 illustrates an implementation of the projection device 205 in the interior of a vehicle. The projection device 205 includes, among other components, a projector 400 having a motor 405. The motor 405 is configured to orient the projector to project images at different locations within the interior of the vehicle (e.g., the rear windshield 410, the ceiling area 415 above the rear windshield 410, the driver side rear pillar 420, the passenger side rear pillar 425, and the rear middle seat 430). For example, to project images on the rear windshield 410, the motor 405 orients the projector 400 to project images in the direction indicated by arrow 435. Also for example, to project images on the driver side rear pillar 420, the motor 405 orients the projector 400 to project images in the direction indicated by arrow 440. In addition, for example, to project images on the passenger side rear pillar 425, the motor 405 orients the projector 400 to project images in the direction indicated by arrow 445. Using a motorized projector can eliminate the costs associated with having a plurality of projectors to project images at different locations. Also, the motorized projector allows the driver to manually adjust the positions of projected images. In some implementations, a driver can manually adjust the positions of projected images using the user interface 215.

The controller 200 is configured to receive a plurality of vehicles parameters from the plurality of vehicle sensors 130 and the plurality of detection sensors 140. The controller 200 is further configured to determine an expected location within the vehicle based on the plurality of vehicle parameters. The expected location corresponds to an interior area of the vehicle where a driver would be expected to look. For example, if the controller 200 determines that the vehicle is backing up, an image can be displayed toward the rear of the vehicle, which is where the driver looks when the vehicle is backing up (e.g., directly by turning his head or indirectly through one or more rear-view mirrors). Similarly, if the controller 200 determines that the vehicle is performing a lane change, the image can be displayed on the front windshield or a front pillar of the vehicle (e.g., the pillar closest to the lane the vehicle is entering).

Figure 5:
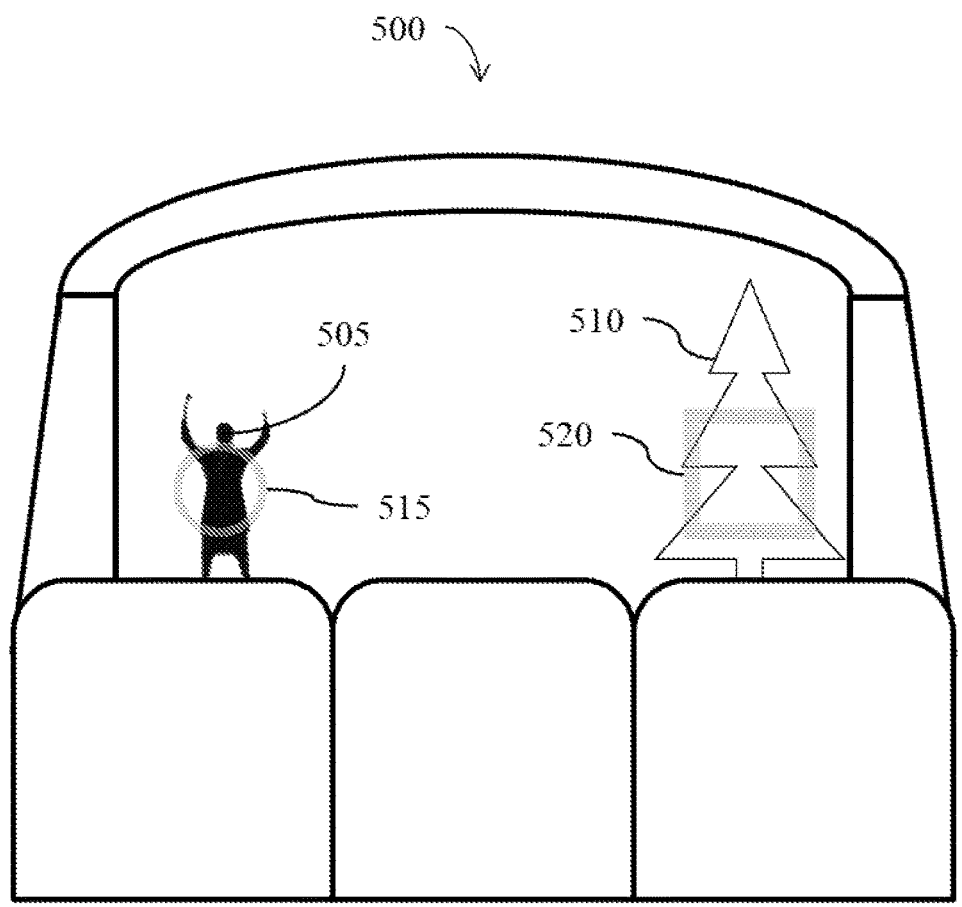
FIG. 5 is a diagram of an interior of a vehicle.

After determining the expected location, the controller 200 determines which image or images to project. In some implementations the projected images include an image captured by one or more cameras mounted on the vehicle. For example, the image can include a full field of view of one or more cameras or a portion of a camera's field of view (e.g., the portion of the field of view in a blind spot of the vehicle, such as below the rear windshield of the vehicle). In other implementations, the projected images include a projection of a highlight or icon representing a detected object (e.g., an object detected using RADAR, LIDAR, image processing, etc.). As the detected object moves, the icon can move with the object. The characteristics of the icon can also vary based on the object. For example, if the object appears to be a person or an animal (hereinafter referred to as a "pedestrian"), the icon can have a particular shape, color, animation, etc. Alternatively, if the object appears to be a stationary object (e.g., a tree, a sign, a parking meter), the icon have a different shape, color, animation, etc. Otherwise, if the detected object appears to be another vehicle, the icon can have yet another shape, color, animation, etc. FIG. 5 illustrates a view of a rear area of a vehicle 500 in an exemplary situation where a pedestrian 505 (i.e., a moving object) and a tree 510 (i.e., a stationary object) are located behind the vehicle. A circle 515 is projected on the rear windshield to alert the driver to the presence of the pedestrian 505. A square 520 is projected on the rear windshield to alert the driver to the presence of the tree 510. The different shapes of the projections enable the driver to differentiate between moving and stationary objects.

Also, in some implementations, if a detected object gets within a predetermined distance from the vehicle, the icon shape, color, animation, etc. changes to indicate the distance between the detected object and the vehicle. In some implementations, different ranges of distances can be associated with different icon characteristics. For example, a green icon can represent an object that is detected a "safe" distance from the vehicle. A yellow icon can represent an object that is detected a "cautionary" distance from the vehicle, and a red icon can represent an object that is detected a "warning" distance from the vehicle. Accordingly, an icon can morph from green into red as the object gets closer to the vehicle.

Also, if the controller 200 determines that the vehicle is traveling too fast (e.g., based on the speed limit or a curvature or condition of the road), an image can be displayed on the front pillar of the vehicle. It should be understood that more than one image can be displayed. For example, in some implementations, during blind spot detection, an image can be displayed on both front and rear pillars on one side of the vehicle. In addition, an image can be projected on a side window of the vehicle representing the window through which an object of interest can be seen or soon will be viewable.

In some implementations, the projectors are used to project an image continuously (e.g., whenever the vehicle is on or being driven). In other implementations, the projectors are used to project an image when particular vehicle operations are performed (e.g., performing a lane change, parking, reversing, etc.). In still other implementations, the projectors are used to project an image when the driver needs to be alerted.

After determining which images to project, the controller 200 operates the projection device 205 to display the images at the expected locations. In some implementations, where the projection device 205 includes a plurality of statically mounted projectors, such as illustrated in FIG. 3, the controller 200 selects and operates one or ride of the plurality of projectors 300A-300C to project the selected images at the expected locations. In other implementations, where the projection device 205 includes a motorized projections, such as illustrated in FIG. 4, the controller 200 determines a set of coordinates for the motor 405 to orient the projector 400 to project the selected image. The set of coordinates is based on the expected location.

In some implementations, when an image is projected, a driver is able to turn off the projected image. For example, in some implementations after an image is initially projected, the driver can tap the brakes to acknowledge and turn off a projected image. In other implementations, the driver can interact with the user interface 215 to acknowledge and turn off a projected image.

In some implementations, the interior surface serving as the background for a projected image is treated to enhance the quality of the projected image. For example, the surface can be smooth and flat. The surface can also be at least partially transparent or, if translucent, can be a light color (e.g., white, cream, or off-white), which makes projected light easier to view. One or more coatings or films can also be applied to the surface to increase the reflective quality of the surface. Films or coatings can also be provided on the surface that mike views of the projected image different from different angles or directions (e.g., to make projected images invisible to other drivers on the road or passengers in the vehicle).

In other implementations, other components of the vehicle can be used to enhance the projected image. For example, in some implementations, backlighting can be provided for a displayed image. When an image is displayed on a side window, backlighting can be provided from a side-view mirror. In particular, lighting visible in the gap between the mirror and the housing for the mirror can provide backlighting far images projected on the side windows.

Thus, the invention provides, among other things, an interior display system for a vehicle. Various features and advantages of the invention are set forth in the following claims.

What is claimed is:
1. An interior display device for a vehicle comprising:
a projection device; and
a controller configured to
receive a first plurality of vehicle parameters,
determine a first expected location within an interior of the vehicle based on the first plurality of vehicle parameters, the first expected location corresponding to a first interior area of the vehicle where a driver would be expected to look, select a first image based on the first plurality of vehicle parameters, operate the projection device to project the first image at the first expected location, receive a second plurality of vehicle parameters, determine a second expected location within the interior of the vehicle based on the second plurality of vehicle parameters, the second expected location corresponding to a second interior area of the vehicle where the driver would be expected to look different from the first interior area, select a second image based on the second plurality of vehicle parameters, and project the second image at the second expected location.

2. The interior display device according to claim 1, wherein the first plurality of vehicle parameters includes at least one vehicle parameter selected from a group comprising gear selection, vehicle speed, turn signal status, brake status, steering angle, and GPS data.

3. The interior display device according to claim 1, wherein the projection device includes a first projector and a second projector, the first projector configured to project images at the first expected location and the second projector configured to project images at the second expected location.

4. The interior display device according to claim 1, wherein the projection device includes
 a projector, and
 a motor configured to control a position of the projector.

5. The interior display device according to claim 4, wherein the controller is further configured to
 determine a set of coordinates for the projector based on the first expected location, and
 operate the motor to change the position of the projector based on the set of coordinates.

6. The interior display device according to claim 1, wherein the first image includes at least one image selected from a group comprising an icon, a full field of view of a camera mounted on the vehicle, and a portion of a field of view of the camera mounted on the vehicle.

7. The interior display device according to claim 1, wherein the controller is further configured to
 receive a signal from the driver of the vehicle, and
 operate the projection device to stop displaying the first image at the first expected location upon receiving the signal.

8. The interior display device according to claim 1, wherein the first plurality of vehicle parameters includes detected objects located around the vehicle.

9. The interior display device according to claim 8, wherein the detected objects are detected by at least one detection device selected from a group comprising RADAR, LIDAR, and a camera.

10. A method for using an interior of a vehicle as a display, the method comprising:
 receiving, at a controller, a first plurality of vehicle parameters;
 determining, by the controller, a first expected location within an interior of the vehicle based on the first plurality of vehicle parameters, the expected location corresponding to a first interior area of the vehicle where a driver would be expected to look;
 selecting, by the controller, a first image based on the first plurality of vehicle parameters;
 displaying, by a projection device, the first image at the first expected location;
 receiving, at the controller, a second plurality of vehicle parameters;
 determining, by the controller, a second expected location within an interior of the vehicle based on the second plurality of vehicle parameters, the second expected location corresponding to a second interior area of the vehicle where the driver would be expected to look different from the first interior area,
 selecting a second image based on the second plurality of vehicle parameters, and
 displaying the second image at the second expected location.

11. The method according to claim 10, wherein receiving the first plurality of vehicle parameters includes receiving at least one vehicle parameter selected from a group comprising gear selection, vehicle speed, turn signal status, brake status, steering angle, and GPS data.

12. The method according to claim 10, wherein displaying, by the projection device, the first image at the first expected location includes displaying the first image with a first projector included in the projection device and wherein displaying the second image at the second expected location includes displaying the second image with a second projector included in the projection device.

13. The method according to claim 10, further comprising
 determining, by the controller, a first set of coordinates for a projector included in the projector device based on the first expected location;
 changing, by a motor, a position of the projector based on the first set of coordinates to display the first image;
 determining, by the controller, a second set of coordinates for the projector included in the projector device based on the second expected location; and
 changing, by the motor, the position of the projector based on the second set of coordinates to display the second image.

14. The method according to claim 10, wherein selecting the first image based on the first plurality of vehicle parameters includes selecting the first image from a group comprising an icon, a full field of view of a camera mounted on the vehicle, and a portion of a field of view of the camera mounted on the vehicle.

15. The method according to claim 10, further comprising
 receiving, by the controller, a signal from the driver of the vehicle; and
 stop displaying, by the projection device, the first image at the first expected location upon receiving the signal.

16. The method according to claim 10, wherein receiving the first plurality of vehicle parameters includes receiving information regarding detected objects located around the vehicle.

17. The method according to claim 16, wherein receiving the information regarding the detected objects includes receiving information detected by at least one detection device selected from a group comprising RADAR, LIDAR, and a camera.

* * * * *